United States Patent
Schultz et al.

(10) Patent No.: US 12,210,218 B2
(45) Date of Patent: Jan. 28, 2025

(54) SYSTEMS AND METHODS FOR ASSEMBLING A HEAD-MOUNTED DISPLAY

(71) Applicant: Meta Platforms Technologies, LLC, Menlo Park, CA (US)

(72) Inventors: James Schultz, Redmond, WA (US); Randall Scott Toy, Sammamish, WA (US); Aaron Schmitz, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/365,731

(22) Filed: Aug. 4, 2023

(65) Prior Publication Data
US 2024/0094564 A1  Mar. 21, 2024

Related U.S. Application Data

(60) Provisional application No. 63/376,270, filed on Sep. 19, 2022.

(51) Int. Cl.
*G02C 13/00* (2006.01)
*G02B 27/01* (2006.01)

(52) U.S. Cl.
CPC ......... *G02C 13/00* (2013.01); *G02B 27/0172* (2013.01); *G02B 2027/0178* (2013.01)

(58) Field of Classification Search
CPC ............... G02C 13/00; G02B 27/0172; G02B 2027/0178
See application file for complete search history.

(56) References Cited

U.S. PATENT DOCUMENTS

| | | | | |
|---|---|---|---|---|
| 9,759,921 | B2* | 9/2017 | Kinoshita | G02B 27/017 |
| 10,671,118 | B1* | 6/2020 | Zhang | G06F 1/1639 |
| 10,798,370 | B2 | 10/2020 | Zhang et al. | |
| 2020/0233213 | A1* | 7/2020 | Porter | G02B 27/0101 |
| 2023/0221568 | A1* | 7/2023 | Schultz | G02B 27/0093 359/13 |
| 2023/0314806 | A1* | 10/2023 | Schultz | G02B 27/0172 359/630 |
| 2023/0324703 | A1* | 10/2023 | Adema | G09G 3/002 345/156 |

OTHER PUBLICATIONS

European Search Report for European Patent Application No. 23194044.6 dated Jan. 22, 2024, 09 pages.

* cited by examiner

*Primary Examiner* — Ryan J. Walters
(74) *Attorney, Agent, or Firm* — Greenberg Traurig, LLP

(57) ABSTRACT

Methods of assembling a head-mounted display (HMD) may include coupling a first digital projector assembly to an HMD frame, coupling a second digital projector assembly to the HMD frame, and then warping the HMD frame to optically align the first digital projector assembly with the second digital projector assembly. The warped HMD frame may be fixed such that the first digital projector assembly and the second digital projector assembly are optically aligned to within a predetermined threshold. Various other methods and systems are also disclosed.

17 Claims, 12 Drawing Sheets

1000

Couple a first digital projector assembly and a second digital projector assembly to an HMD frame
1010

Warp the HMD frame to align a first optical output of the first digital projector assembly with a second optical output of the second digital projector assembly
1020

Secure an enclosure to the warped HMD frame to fix the warped HMD frame in a target geometry with the first digital projector assembly optically aligned to the second digital projector assembly
1030

*FIG. 10*

SYSTEMS AND METHODS FOR ASSEMBLING A HEAD-MOUNTED DISPLAY

CROSS REFERENCE TO RELATED APPLICATION

This application claims the benefit of U.S. Provisional Application No. 63/376,270, filed 19 Sep. 2022, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 10 is a flow chart illustrating a method for assembling HMDs, according to at least one additional embodiment of the present disclosure.

Figure 1:
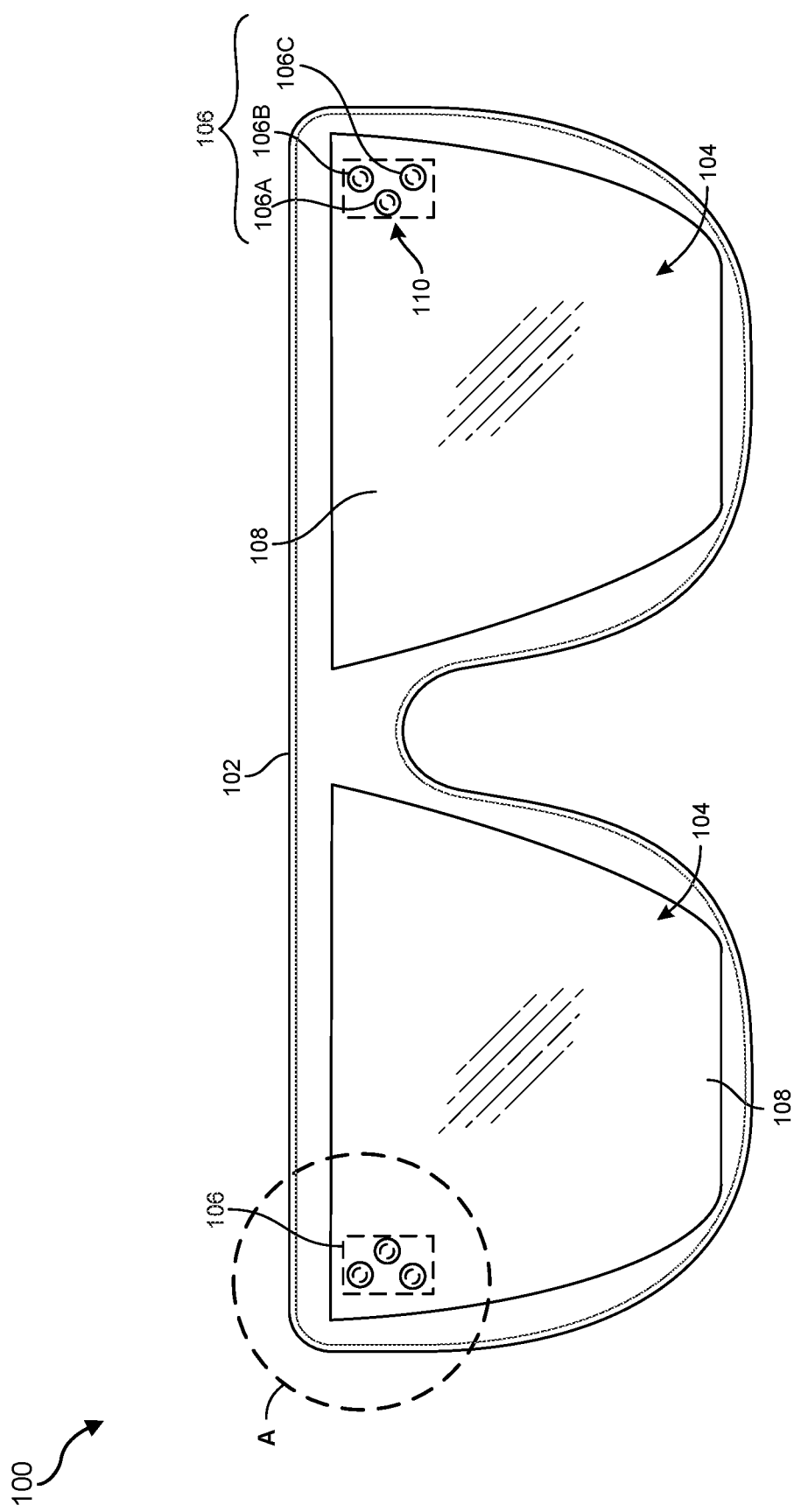
FIG. 1 is a plan view of a head-mounted display (HMD), according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Head-mounted displays (HMDs) including one or more near-eye displays are often used to present visual content to a user for use in artificial-reality applications. One type of near-eye display includes a waveguide that directs light from a projector to a location in front of the user's eyes. Because of the visual sensitivity of human eyes, slight deviations in optical quality can be very apparent to the user. Proper alignment of projectors and waveguides with each other, with a supporting frame, relative to the user, and relative to the overall sensory system can be important to inhibit such deviations and to improve the user's experience viewing visual content presented by near-eye displays.

An optical bench may be used as a support when mounting optical components to each other and/or to a frame. An optical bench is a solid and stable platform at a known position and orientation. Optical benches are usually formed of a heavy material, such as stone (e.g., granite) or metal (e.g., steel). Damping structures may be used to reduce vibrations. The use of an optical bench may provide a known and stable coordinate system to which optical components may be aligned.

The present disclosure is generally directed to systems and methods for aligning optical components (e.g., of near-eye displays), such as for aligning two digital projector assemblies with each other. For example, embodiments of the present disclosure may include coupling two digital projector assemblies to an HMD frame, which may include abutting the digital projector assemblies against surfaces of the HMD frame. The HMD frame may then be warped and the warped HMD frame may be fixed in place to optically align the two digital projector assemblies to each other. By aligning the digital projector assemblies in this fashion after coupling them to the HMD frame, capital expenditures and operating expenditures may be reduced, such as by requiring less equipment or less expensive equipment, compared to alignment systems that involve precise orientation and placement of digital projector assemblies on the HMD frame. In addition, a quality of alignment of optical components with each other and/or with the HMD frame may increase as a result of the post-placement alignment.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
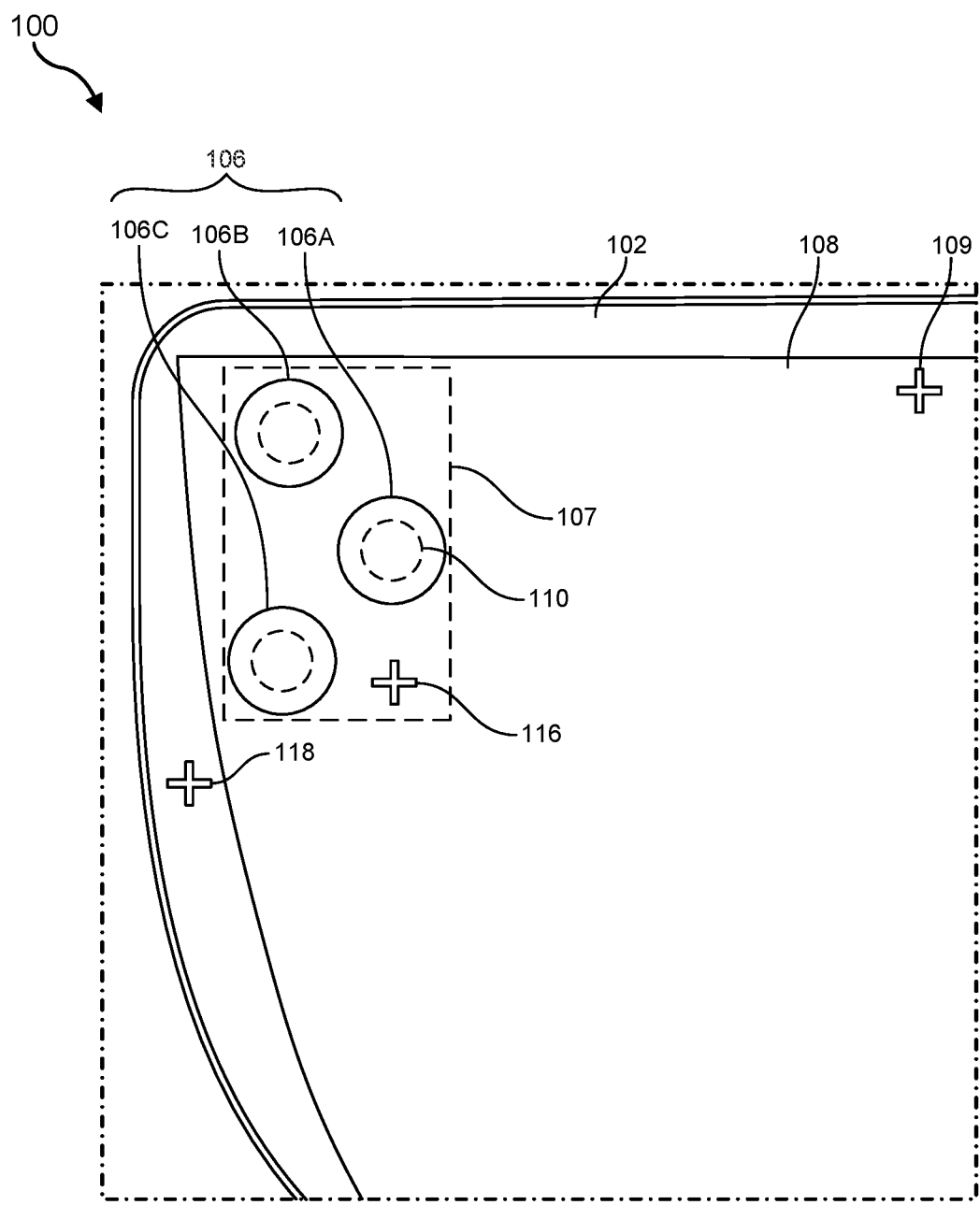
FIG. 2 is a detailed view of a digital projector assembly mounted to a frame of the HMD, taken at dashed circle A of FIG. 1, according to at least one embodiment of the present disclosure.
Figure 11:
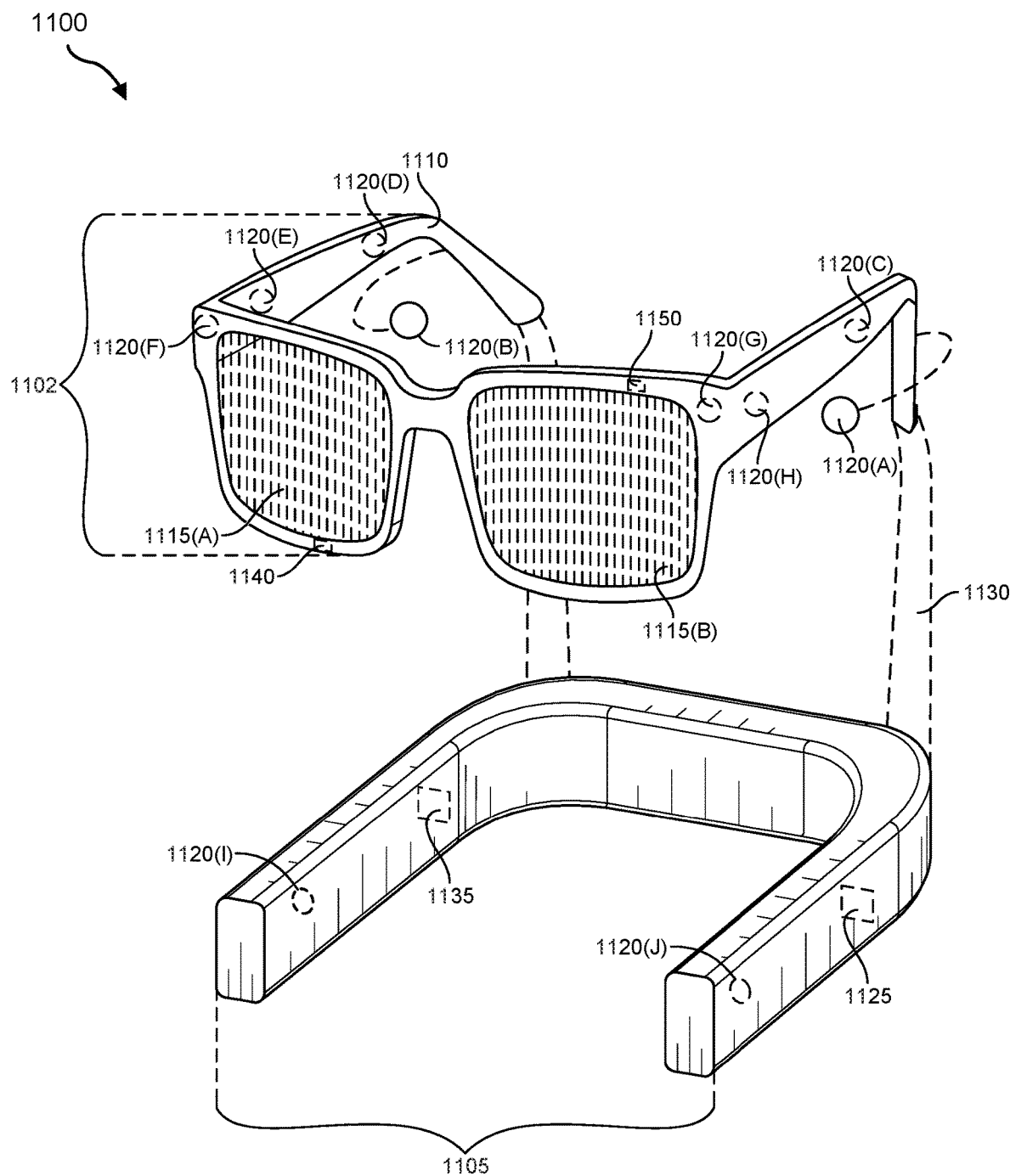
FIG. 11 is an illustration of example augmented-reality glasses that may be used in connection with embodiments of this disclosure.

With reference to FIGS. 1 and 2, the following will describe example head-mounted displays and components thereof, according to embodiments of the present disclosure. The optical alignment of a projected pattern as viewed by a camera will then be described with reference to FIG. 3. Next, an embodiment of a head-mounted display and cameras for alignment will be described with reference to FIG. 4. Various stages of alignment of optical components with a fixture will then be described with reference to FIGS. 5-7. With reference to FIGS. 8A and 8B, potential optical alignment errors and their correction will be described. Next, various methods for assembling a head-mounted display according to the present disclosure will be described with reference to FIGS. 9 and 10. Finally, example augmented-reality glasses and virtual-reality headsets that may be used in connection with embodiments of this disclosure will be descried with reference to FIGS. 11 and 12.

FIG. 1 is a plan view of a head-mounted display 100, according to at least one embodiment of the present disclosure. The head-mounted display 100 may include a frame 102 and a display assembly 104 coupled to the frame 102. The display assembly 104 for each eye may include a digital projector assembly 106 and a waveguide 108 configured to direct images from the digital projector assembly 106 to a user's eye. In some examples, the digital projector assembly 106 may include a plurality of (e.g., three) subprojectors 106A, 106B, and 106C that are configured to project light of different wavelengths (e.g., colors, such as red, green, blue, infrared, etc.). The waveguide 108 may include at least one input grating 110 positioned adjacent to and optically aligned with the digital projector assembly 106. The input grating 110 may be configured to enable light from the subprojectors 106A, 106B, and 106C to enter into the waveguide 108 to be directed to the center of the waveguide 108 for presentation to the user's eye. For example, as shown in FIG. 1 in dashed lines, the input grating 110 may include three optical apertures respectively aligned with the three subprojectors 106A, 106B, and 106C of the digital projector assembly 106.

In some examples, the head-mounted display 100 may be implemented in the form of augmented-reality glasses. Accordingly, the waveguide 108 may be at least partially transparent to visible light to allow the user to view a real-world environment through the waveguide 108. Images presented to the user's eye by the digital projector assemblies 106 may overlay the user's view of the real-world environment.

The waveguide 108 may be aligned to the digital projector assemblies 106, to a user's view, and/or to the frame 102. In one example, the digital projector assemblies 106 may first be secured to the frame 102 and aligned with each other, and the waveguides 108 may then be aligned with the digital projector assemblies 106 and secured to the frame 102. In another example, the waveguides 108 may be respectively aligned with and secured to the digital projector assemblies 106, and then the combined waveguides 108 and digital projector assemblies 106 may be secured to the frame 102. The digital projector assemblies 106 and waveguides 108 may then be aligned with each other through warping of the frame 102, as further explained below.

FIG. 2 is a detailed view of the digital projector assembly 106 mounted to the frame 102 of the head-mounted display 100, taken at dashed circle A of FIG. 1, according to at least one embodiment of the present disclosure. As shown in FIG. 2, the digital projector 106 may be mounted on the frame 102 of the head-mounted display 100, such as in an upper corner of the frame 102. In one example, the first subprojector 106A may include a blue light source, the second subprojector 106B may include a red light source, and the third subprojector 106C may include a green light source. Other colors and arrangements of the subprojectors 106A, 106B, and 106C may also be possible.

To assemble the head-mounted display 100, the three subprojectors 106A, 106B, and 106C may be initially assembled with each other (e.g., three subprojectors 106A, 106B, 106C mounted to a common substrate 107, three collimating lenses aligned on the three subprojectors 106A, 106B, 106C, etc.) to form the digital projector assembly 106 as a unit. The digital projector assembly 106 (e.g., the substrate 107 of the subprojectors 106A, 106B, 106C) may include one or more projector fiducial marks 116, which may be used in optically aligning (e.g., positioning, orienting, securing) the digital projector assembly 106 with the frame 102. In some examples, the frame 102 may likewise include one or more frame fiducial marks 118 to assist in the optical alignment of the digital projector assembly 106 with the frame 102.

Optical alignment of the digital projector assembly 106 relative to the frame 102 may involve viewing the digital projector assembly 106 and/or frame 102 during placement of the digital projector assembly 106 in or on the frame 102 with one or more cameras, which may be used to identify the location and orientation of the projector fiducial mark(s) 116 relative to the location and orientation of the frame fiducial mark(s) 118. The projector fiducial mark(s) 116 and the frame fiducial mark(s) 118 are each shown in FIG. 2 in the shape of a plus sign. In additional examples, other shapes, physical features (e.g., of the digital projector assembly 106 and/or of the frame 102), reflective surfaces, or other optical identifiers may be used to optically align the digital projector assembly 106 relative to the frame 102. In some embodiments, the digital projector assembly 106 may be aligned relative to the frame 102 using an image projected by the digital projector assembly 106, such as is explained below with reference to FIG. 3.

As explained below, in some embodiments, precise alignment of the digital projector assembly 106 to the frame 102 may not be necessary. For example, the digital projector assembly 106 may be secured to the frame 102 by abutting the digital projector assembly 106 (e.g., the substrate 107) against a surface of the frame 102 and then attaching the digital projector assembly 106 directly to the frame 102, such as by fastening, adhering, or welding. Later, the frame 102 may be warped to align an optical output of the digital projector assembly 106 with an optical output of the other digital projector assembly 106 (see FIG. 1).

In some examples, the waveguide 108 may include a waveguide fiducial 109, which may be used in optically aligning (e.g., positioning, orienting, securing) the waveguide 108 to the frame 102 and/or to the digital projector assembly 106. In addition, the input gratings 110 of the waveguide 108 may be optically aligned with the subprojectors 106A, 106B, and 106C. In some examples, the input gratings 110 may be smaller than respective apertures of the subprojectors 106A, 106B, and 106C as shown in FIG. 2. In additional examples, the input gratings 110 may be substantially the same size as or larger than the respective apertures of the subprojectors 106A, 106B, and 106C.

Figure 3:
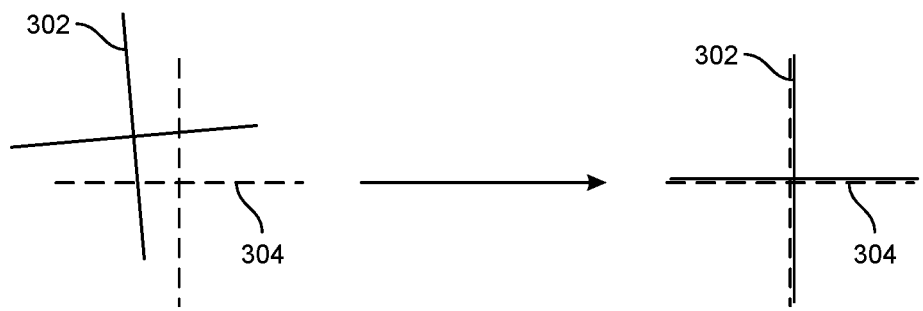
FIG. 3 illustrates optical alignment of a projected pattern as viewed by a camera, according to at least one embodiment of the present disclosure.

FIG. 3 illustrates optical alignment of a projected pattern 302 as viewed by a camera, according to at least one embodiment of the present disclosure. The projected pattern 302 may be aligned with a camera target 304. The projected pattern 302 may be produced by a digital projector assembly, such as the digital projector assembly 106 described above. One or more cameras may view the projected pattern 302 and compare the location and orientation of the projected pattern 302 to the camera target 304. The digital projector assembly and/or a frame to which the digital projector assembly is to be mounted may be moved (e.g., laterally shifted, angled, rotated, warped, etc.) to align the projected pattern 302 with the camera target 304 to an acceptable resolve (e.g., within an acceptable tolerance). In some examples, the alignment of the projected pattern 302 with the camera target 304 may be performed while exposing the digital projector assembly 106 and the frame 102 to conditions that may be expected during use of the resulting assembly. For example, a heat load may be applied to the digital projector assembly 106 during alignment to mimic thermal loading that may occur during use.

Figure 4:
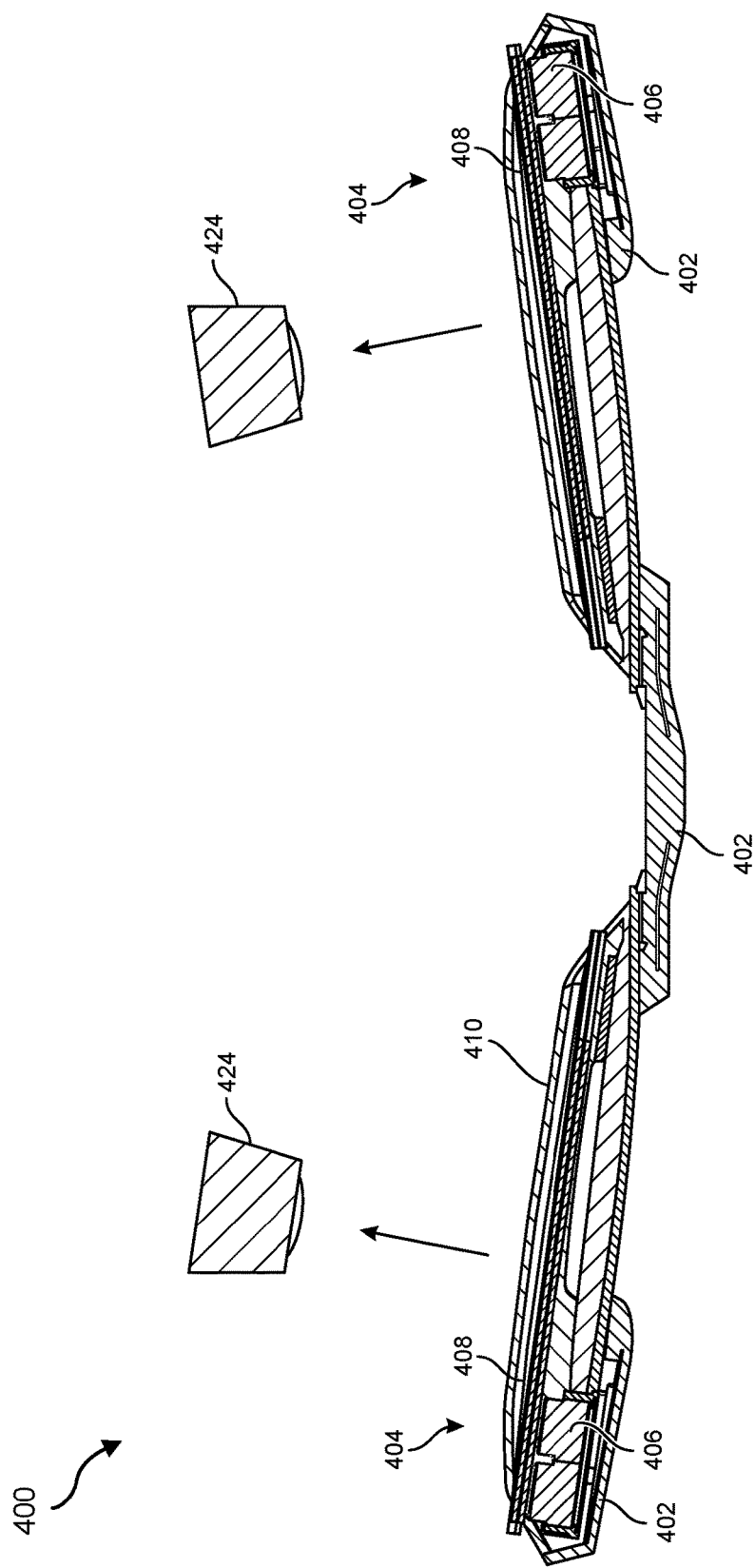
FIG. 4 is a cross-sectional view of an HMD with alignment cameras, according to at least one embodiment of the present disclosure.

FIG. 4 is a cross-sectional view of a head-mounted display 400 with alignment cameras 424, according to at least one embodiment of the present disclosure. In at least some respects, the head-mounted display 400 may be similar to the head-mounted display 100 described above. For example, the head-mounted display 400 may include a frame 402, and a display assembly 404 including a digital projector assembly 406 and a waveguide 408 mounted to the frame 402.

The alignment cameras 424 may be used during assembly of the head-mounted display 400 to optically align the digital projector assembly 406 with the frame 402, to align the digital projector assemblies 406 to each other, and/or to optically align the waveguide 408 (e.g., input gratings of the waveguide 408) with the digital projector assembly 406. For example, the alignment cameras 424 may be used to detect the location and/or orientation of a fiducial mark (e.g., the projector fiducial marks 116, the frame fiducial marks 118, the waveguide fiducial marks 109, etc.), a physical component or feature, a reflective material, etc. In additional examples, the alignment cameras 424 may be used to detect a location and/or orientation (e.g., angle) of a projected image (e.g., the projected pattern 302) relative to a target (e.g., the camera target 304). This detected information may be used to adjust a position and/or orientation of the digital projector assemblies 406 relative to each other and/or of the waveguides 408 relative to the digital projector assemblies 406 and/or frame 402.

The frame 402 may include an enclosure 410 on a rear (e.g., user-facing) side of the frame 402. The enclosure 410 may be secured to the frame 402 to fix a geometry of the frame 402 for alignment of the digital projector assemblies 406 relative to each other, as will be further explained below.

Figure 5:
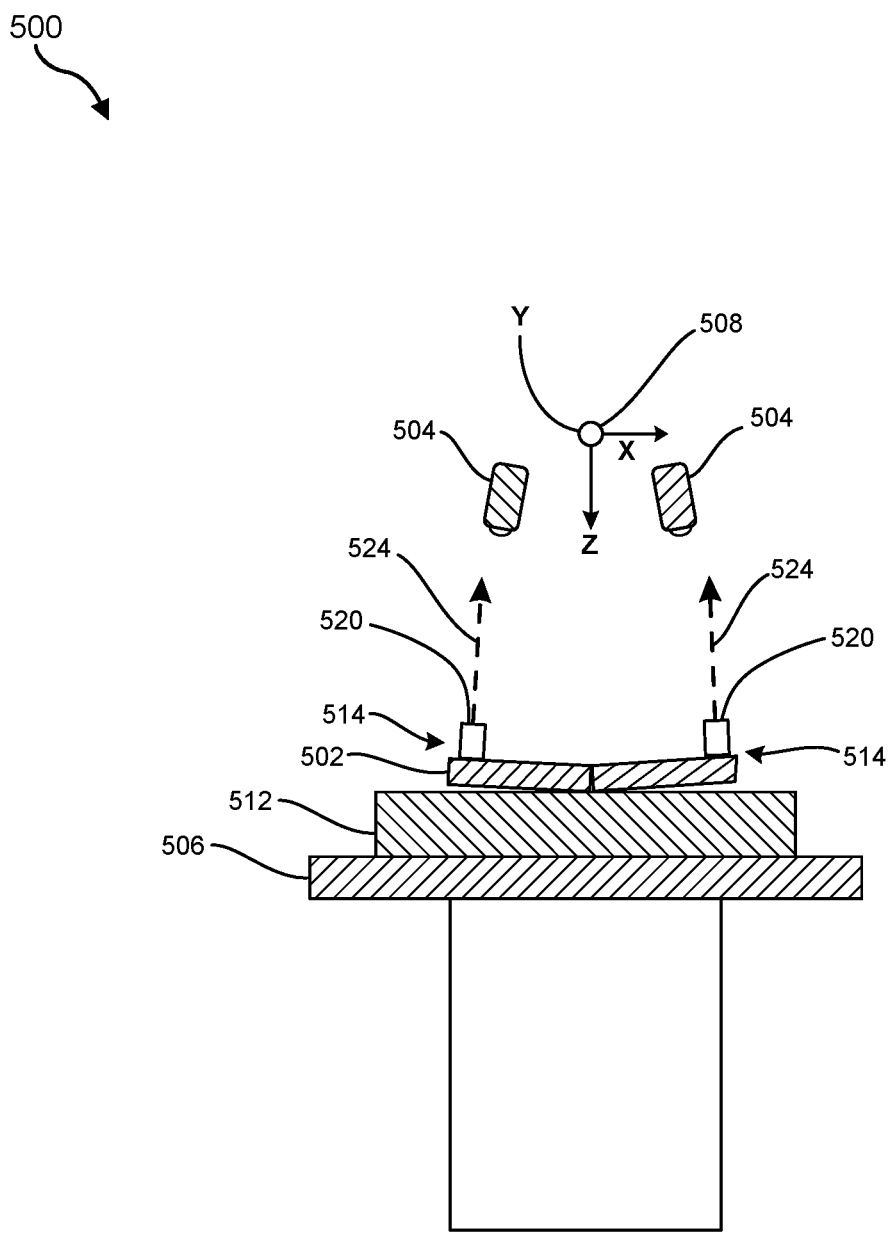
FIG. 5 is a side view of a system for assembling a head-mounted display, with a frame and optical alignment cameras for aligning optical components coupled to the frame to each other, according to at least one embodiment of the present disclosure.

FIG. 5 is a side view of a system 500 for assembling an HMD, with a frame 502 (e.g., an HMD frame, a projector frame, etc.) and optical alignment cameras 504 for aligning optical components to each other and/or to the frame 502, according to at least one embodiment of the present disclosure.

Frames for supporting optical components may be subject to manufacturing variabilities and tolerances that result in each unique frame having slightly different and/or unpredictable mounting structures (e.g., mounting structures with different relative locations, angles, thicknesses, etc.) for the optical components. This variability in frame mounting structures may cause optical components mounted thereto to be misaligned unless the optical components are properly aligned (e.g., with each other, with a frame coordinate system, etc.) and fixed in place during assembly. Unless corrected, the misalignment may cause perceptible optical quality reductions, potentially diminishing a user's experience. Thus, the system 500 may be configured for aligning optical components to each other and/or to the frame 502 for improvement of optical quality and user experience.

The system 500 may include a support mechanism 506 that is configured to hold the frame 502 in place. The optical alignment cameras 504 may be associated with (e.g., coupled to) the fixed support mechanism 506. An optical coordinate system 508 associated with the optical alignment cameras 504 may be used as a basis for alignment of optical components (e.g., projector assemblies, waveguide assemblies, lenses, etc.) mounted to the frame 502. The optical coordinate system 508 is represented in FIG. 5 by axes X, Y (e.g., out of and perpendicular to the page in FIG. 5), and Z.

The fixed support mechanism 506 may include a fixture 512 shaped and configured for receiving and holding the frame 502. For example, the fixture 512 may have a shape that is complementary to a shape of the frame 502 and/or to a shape of components or portions of the frame 502. The fixture 512 may include one or more retaining mechanisms, such as one or more clips, magnets, grooves, grippers, etc., for retaining the frame 502 in place. The fixture 512 may also include a warping mechanism that may be capable of warping (e.g., bending, twisting, etc.) the frame 502 to align optical components (e.g., projectors, waveguides, lenses, etc.) attached thereto.

The frame 502 may include one or more features that can be used as fiducials for determining an initial orientation and position of the frame 502 relative to the optical coordinate system 508. For example, the frame 502 may include one or more fiducial marks 116 as discussed above with reference to FIG. 2, a physical feature (e.g., a frame part, a surface, a mounting structure, a notch, etc.) that can be optically identified, and/or a colored mark (e.g., paint, ink, distinguishable material, etc.) that can be optically identified. In additional embodiments, the initial position and orientation of the frame 502 and its frame coordinate system 510 may be determined with light (e.g., radar, laser, structured light, etc.) and/or sound (e.g., ultrasound, sonar, etc.) directed toward and reflected off the frame 502 to an appropriate sensor. In yet further embodiments, the initial position and orientation of the frame 502 may not be determined. Rather, an output of the optical component(s) to be aligned may be detected by the optical alignment cameras 504 without regard to the position and orientation of the frame 502.

In the example shown in FIG. 5, the optical components to be aligned are digital projector assemblies 520. The digital projector assemblies 520 may include one or more subprojectors. In some examples, the digital projector assemblies 520 may also include one or more waveguides pre-assembled (e.g., pre-aligned and secured) to the subprojectors.

The digital projector assemblies 520 may be initially secured to the frame 502 at projector mounting locations 514. By way of example and not limitation, the projector mounting locations 514 may be at upper corners of the frame 502. In additional examples, the projector mounting locations 514 may be at a nose bridge of the frame 502, along a top of the frame 502 to be above an optical aperture when the frame 502 is worn by a user, along a side of the frame 502 adjacent to the optical aperture, or along a bottom of the frame 502 below the optical aperture. The digital projector assemblies 520 may abut against a surface of the frame 502 at the projector mounting locations 514 and secured to the frame 502 by one or more fasteners (e.g., bolts, screws, etc.), adhesive, and/or welds. The digital projector assemblies 520 may be secured to the frame 502 prior to aligning the digital projector assemblies 520 to each other, as explained below.

As illustrated in FIG. 5, in some cases the digital projector assemblies 520 will initially be misaligned relative to each other. In some examples, aligning the digital projector assemblies 520 with each other may involve aligning an optical output 524 (e.g., a projected image) of each of the digital projector assemblies 520 with one or more targets as explained above with reference to FIG. 3, with the respective optical alignment cameras 504, and/or with the optical coordinate system 508. For example, the optical outputs 524 may initially be misaligned with an optical target of the optical alignment cameras 504. For example, the optical outputs 524 may be misaligned from respective optical targets due to an angular difference that is greater than a predetermined threshold, such as 1 degree, 0.5 degree, 15 arcminutes, 10 arcminutes, 5 arcminutes, or 2 arcminutes. This misalignment may result from the projector mounting locations 514 on the frame 502 being initially insufficiently aligned in location and/or angle to achieve a desired level of alignment of the digital projector assemblies 520 with each other. Alternatively or additionally, the misalignment may result from inaccuracies in the process of mounting the digital projector assemblies 520 to the frame 502.

Figure 6:
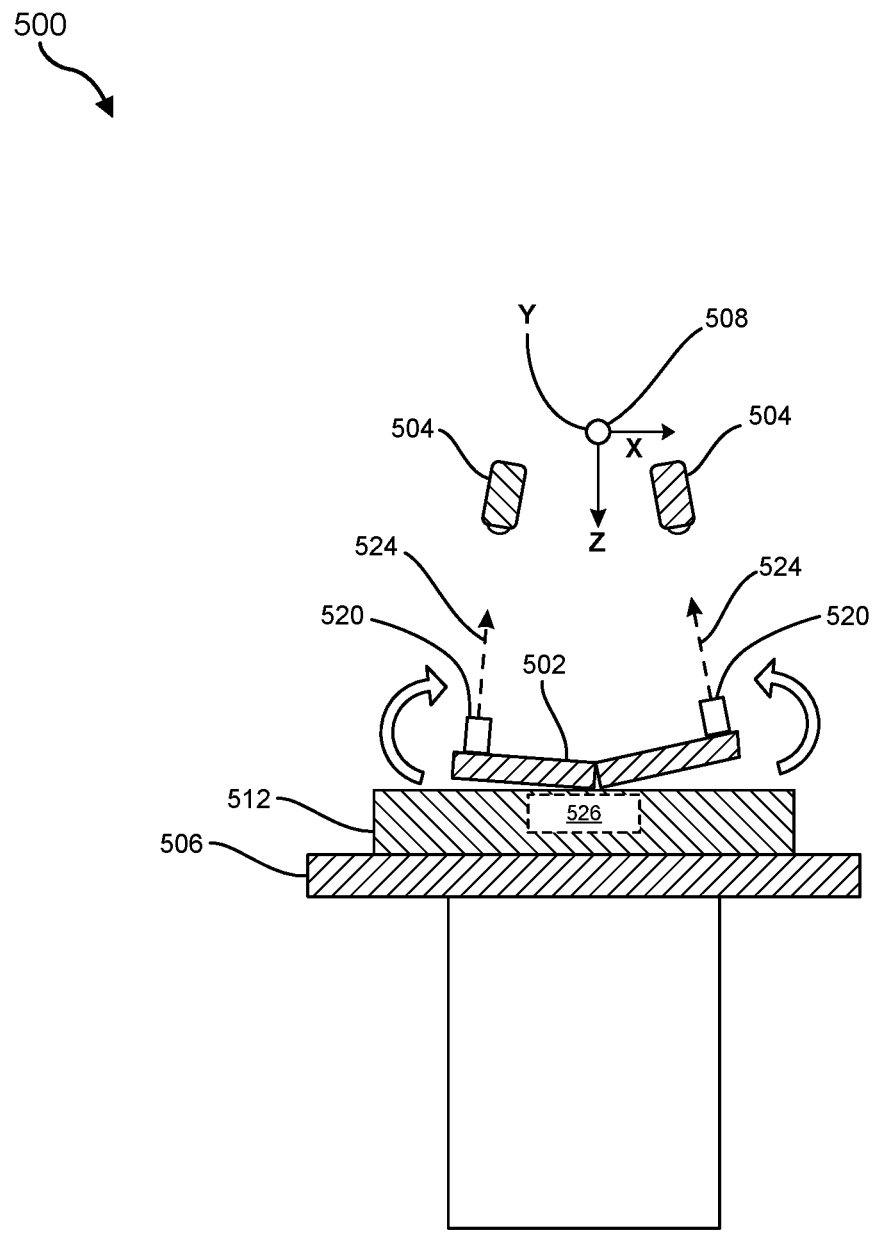
FIG. 6 is a side view of the system of FIG. 5, after the frame is warped, according to at least one embodiment of the present disclosure.

FIG. 6 is a side view of the system 500 of FIG. 5, after the frame 502 is warped to align the digital projector assemblies 520 to each other, according to at least one embodiment of the present disclosure.

After the optical outputs 524 (e.g., an angle and/or origin of the optical outputs 524) of the digital projector assemblies 520 relative to the optical coordinate system 508 are determined as discussed above with reference to FIGS. 3 and 5, the frame 502 may be warped by the fixture 512 to align the digital projector assemblies 520 to within a predetermined threshold. For example, the predetermined threshold may be within 1 degree of rotation, within 0.5 degree of rotation, within 15 arcminutes of rotation, within 10 arcminutes of rotation, within 5 arcminutes of rotation, within 2 arcminutes of rotation, within 1 arcminute of rotation, etc. The warping may be in the form of twisting and/or bending the frame 502. This warping of the frame 502 may effectively move the digital projector assemblies 520 and their optical outputs 524 to within the predetermined threshold.

By way of example and not limitation, the fixture 512 may include one or more warping mechanisms, such as a hexapod, a linear stage, and/or a goniometer for warping the frame 502 to align the digital projector assemblies 520. The warping mechanism may be configured to support the frame 502 and to rotate (e.g., bend and/or twist) the frame about an X-axis, about a Y-axis, and/or about a Z-axis. In addition, the fixture 512 may be configured to warp the frame 502 with a high accuracy and precision, such as to angular accuracies within 1 degree, 0.5 degree, 15 arcminutes, 10 arcminutes, 5 arcminutes, 2 arcminutes, or 1 arcminute.

In some examples, the frame 502 may initially be overwarped past a target geometry at which the digital projector assemblies 520 are aligned with each other. The frame 502 may then be allowed to spring back to the target geometry in which the digital projector assemblies 520 are aligned to each other within the predetermined threshold. The amount of overwarping may depend on the material of the frame 502, the extent of the final warping that is desired, the temperature of the frame 502 upon warping, the speed of the warping, and potentially other factors.

Optionally, the fixture 512 may include a heating element 526 for applying heat to the frame 502 to facilitate warping. For example, certain polymers may bend and/or twist more easily when heated. Removing the heat from the frame 502 after warping, such as by allowing the frame 502 to cool or by directing a jet or fan of cool air at the frame 502, may help solidify the frame 502 in its warped geometry with the digital projector assemblies 520 properly aligned to within the predetermined threshold. Heat may be applied to at least portions of the frame 502 where plastic deformation is intended (e.g., at a nose bridge, etc.)

The warping of the frame 502 may be automatically accomplished with a processor of a computing system that may be included in and/or in communication with the system 500. For example, optical data from the optical alignment cameras 504 may be used to identify the direction of the optical outputs 524 of the digital projector assemblies 520, which may in turn be used to identify an appropriate amount, direction, and type of warping (e.g., bending and/or twisting) in the frame 502 needed to align the optical outputs 524. An amount of overwarping that may be needed (depending on, for example, the material type and thickness of the frame 502) to account for the frame 502 springing back into the target geometry may also be automatically determined. In cases where heat is to be applied, the system 500 may also automatically determine the amount of heat to be applied by the heating element 526, such as based on the material type and thickness of the frame 502, the amount of warping to be performed, etc.

Figure 7:
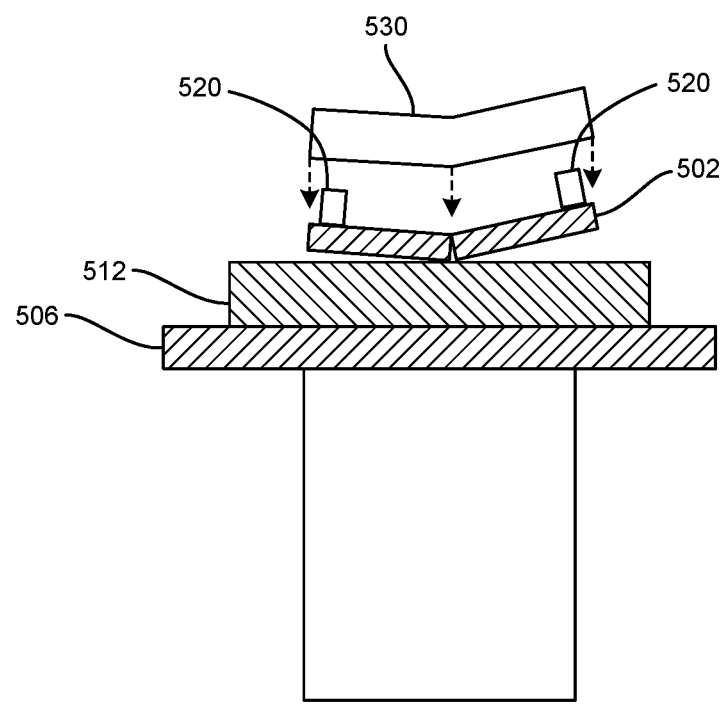
FIG. 7 is a side view of the system of FIG. 6, with an enclosure being secured to the frame after warping of the frame, according to at least one embodiment of the present disclosure.
Figure 8A:
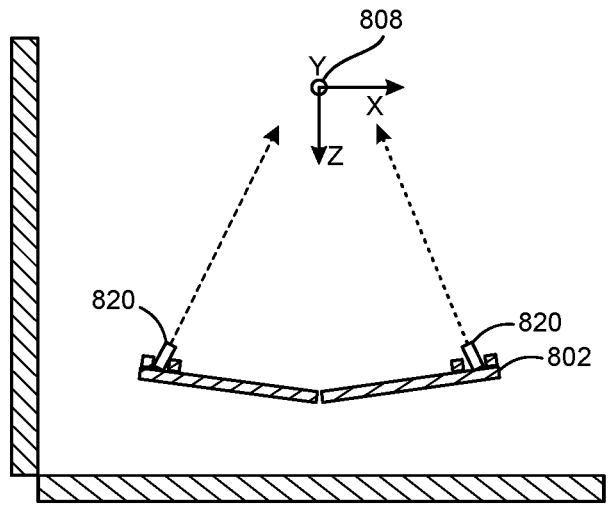
FIG. 8A is a graphical representation of a frame and digital projector assemblies in an initial, misaligned orientation relative to an optical coordinate system, according to at least one embodiment of the present disclosure.
Figure 8B:
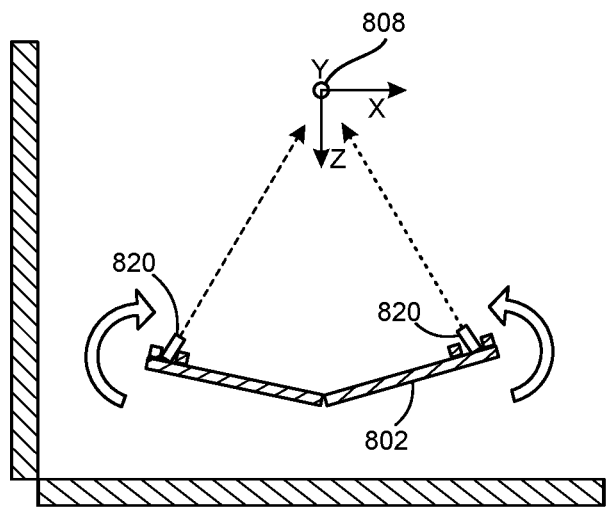
FIG. 8B is a graphical representation of the frame and digital projector assemblies in a corrected, aligned orientation relative to the optical coordinate system after warping the HMD frame, according to at least one embodiment of the present disclosure.

FIG. 7 is a side view of the system 500 of FIG. 6, with an enclosure 530 being secured to the frame 502 after warping of the frame 502, according to at least one embodiment of the present disclosure.

With the frame 502 held by the fixture 512 in its warped position, an enclosure 530 may be secured to the frame 502 with a fixing mechanism. For example, the fixing mechanism may secure the enclosure 530 to the frame 502 with one or more fasteners (e.g., bolts, screws), an adhesive, and/or a weld. In some embodiments, the enclosure 530 may be used to fix the frame 502 in its warped geometry such that the digital projector assemblies 520 are aligned with each other to within the predetermined threshold. The enclosure 530 may include a rigid material to hold the frame 502 in the target geometry. For example, the enclosure 530 may include a metal material, a fiber-matrix composite material, a rigid plastic material, or a combination thereof. In some examples, the enclosure 530 may be selected from a group of enclosures 530 that have various geometries. In this manner, the enclosure 530 may match and be complementary to the geometry of the warped frame 502.

Although the system 500 is shown in FIGS. 5 and 6 as including two optical alignment cameras 504 for positioning two digital projector assemblies 520, the present disclosure is not so limited. In additional embodiments, the system 500 may include only one optical alignment camera 504, such as for aligning a single projector assembly 520 to the frame 502 and/or for mounting two or more digital projector assemblies 520 to the frame 502. In additional embodiments, the digital projector assembly 520 may be replaced by any optical component or assembly, such as a waveguide, a projector and waveguide assembly, an optical lens, a mirror or other reflective surface, etc. In other examples, a similar process as described with reference to FIGS. 5-7 may be performed to mount one optical component to another (e.g., rather than to the frame 502), such as a waveguide to a projector or a projector to a waveguide (e.g., to align an optical input grating of a waveguide with a projector). Thus, embodiments of the present disclosure are not limited to the particular examples that are described and shown herein.

FIG. 8A is a graphical representation of a frame 802 and digital projector assemblies 820 in an initial, misaligned orientation relative to an optical coordinate system 808. FIG. 8B is a graphical representation of the frame 802 and digital projector assemblies 820 in a corrected, aligned orientation relative to the optical coordinate system 808.

As illustrated in FIG. 8A, the digital projector assemblies 820 may be coupled to the frame 802. The digital projector assemblies may be misaligned with the optical coordinate system 908 beyond a predetermined threshold. By way of example and not limitation, this misalignment may be due to manufacturing errors or tolerances, a manner by which the digital projector assemblies 820 are coupled to the frame 802, etc.

As illustrated in FIG. 8B, the frame 802 may be warped (e.g., bent, twisted, etc.) to compensate for any initial misalignment of the digital projector assemblies 820. The warping may be performed to align the digital projector assemblies 820 to within the predetermined threshold for improved optical quality. As noted above, in some examples the frame 802 may be overwarped and allowed to spring back to a target geometry with the digital projector assemblies 820 aligned. In addition, at least a portion of the frame 802 may be heated to facilitate the warping. After the warping of the frame 802 is complete, an enclosure may be secured to the frame 802 to fix the frame in the target geometry with the digital projector assemblies 820 aligned with each other (e.g., with each of the digital projector assemblies 820 being aligned to the optical coordinate system 808).

In some examples, this alignment process, including warping the frame 802 into a target geometry with the digital projector assemblies 820 being aligned, may improve an optical quality of a resulting optical system (e.g., a head-mounted display system, etc.). In addition, the frame warping may facilitate alignment of optical components compared to other alignment procedures, such as precisely mounting the optical components to the frame 802 in an initially aligned position and orientation.

Figure 9:
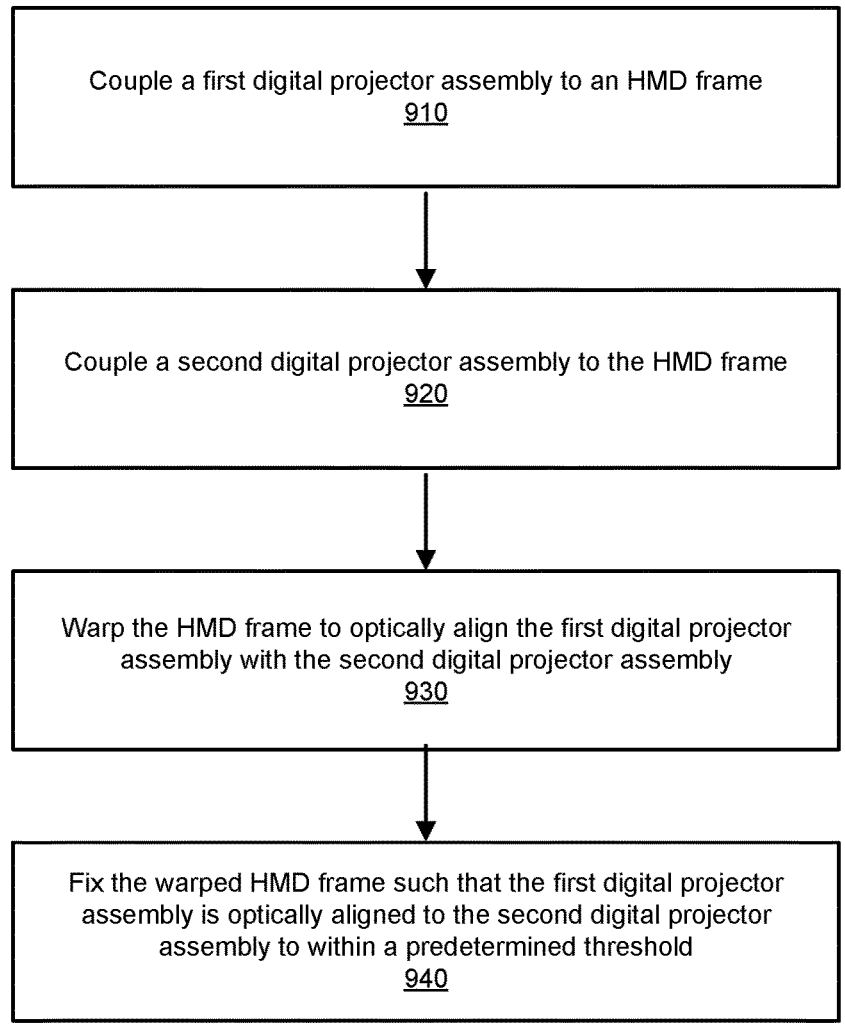
FIG. 9 is a flow chart illustrating a method for assembling HMDs, according to at least one embodiment of the present disclosure.

FIG. 9 is a flow chart illustrating a method 900 for assembling a head-mounted display (HMD), according to at least one embodiment of the present disclosure. At operation 910, a first digital projector assembly may be coupled to an HMD frame. Operation 910 may be performed in a variety of ways. For example, the first digital projector assembly may be abutted against a surface of the HMD frame. The coupling may be performed via one or more fasteners (e.g., bolts, screws), adhesive, and/or welds. The first digital projector assembly may include at least one subprojector and optionally a pre-assembled waveguide. Operation 910 may be performed without precisely aligning the first digital projector assembly to the HMD frame and/or without aligning the first digital projector assembly to another digital projector assembly at this stage.

At operation 920, a second digital projector assembly may be coupled to an HMD frame. Operation 920 may be performed in a variety of ways. For example, operation 920 may be performed in the same or a similar manner to operation 910.

In some examples, an offset (e.g., an angular offset) between a first optical output of the first digital projector assembly and a second optical output of the second digital projector assembly may be determined. This offset may be determined by, for example, measuring a first angle of the first optical output, measuring a second angle of the second optical output, and determining an angular difference between the first angle and the second angle relative to each other and/or relative to one or more targets. This offset may be corrected (e.g., reduced and/or eliminated) in subsequent operations.

At operation 930, after operations 910 and 920 are complete, the HMD frame may be warped in a manner that optically aligns the first digital projector assembly with the second digital projector assembly. Operation 930 may be performed in a variety of ways. For example, a fixture may be used to bend and/or twist the HMD frame to achieve a target geometry. In some examples, the HMD frame may be overwarped and then allowed to spring back to the target geometry. In additional examples, at least a portion of the HMD frame (e.g., a portion to be plastically deformed) may be heated to facilitate the warping.

After the warping of the HMD frame is complete, the first and second digital projector assemblies may be aligned with each other to angular accuracies within a predetermined threshold, such as within 1 degree, 0.5 degree, 15 arc-minutes, 10 arcminutes, 5 arcminutes, 2 arcminutes, or 1 arcminute. By way of several examples, an optical output of each of the digital projector assemblies may be aligned with a camera target of a respective optical alignment camera or of a single optical alignment camera, with an optical coordinate system, or with any other suitable target to result in a projected image with high optical quality.

At operation 940, the warped HMD frame may be fixed in its target geometry such that the first digital projector assembly and the second digital projector assembly are optically aligned to within the predetermined threshold. Operation 940 may be performed in a variety of ways. For example, an enclosure may be secured to the warped HMD frame to hold the warped HMD frame in the target geometry. The enclosure may be secured to the HMD frame by fastening (e.g., screwing, bolting), adhering, and/or welding.

FIG. 10 is a flow chart illustrating a method 1000 for assembling an HMD according to at least one additional embodiment of the present disclosure. At operation 1010, a first digital projector assembly and a second digital projector assembly may be coupled to an HMD frame. Operation 1010 may include abutting the first digital projector assembly and the second digital projector assembly against the HMD frame. Operation 1010 may be performed in a variety of ways. For example, the first and second digital projector assemblies may be fastened, adhered, and/or welded to the HMD frame. The digital projector assemblies may be abutted against surfaces of the HMD frame.

At operation 1020, the HMD frame may be warped to align a first optical output of the first digital projector assembly with a second optical output of the second digital projector assembly. Operation 1020 may be performed in a variety of ways. For example, the HMD frame may be bent and/or twisted by a warping mechanism of a fixture holding the HMD frame. The extent of the warping may be determined by first measuring the first optical output and the second optical output and identifying an offset between the two optical outputs. In some cases, the HMD frame may be overwarped past a target geometry and allowed to spring back to the target geometry with the optical outputs aligned to within a predetermined threshold (e.g., within 10 arc-minutes or less).

At operation 1030, an enclosure may be secured to the warped HMD frame to fix the HMD frame in the target geometry. Operation 1030 may be performed in a variety of ways. For example, an adhesive, weld, and/or fastener may be used to secure the enclosure to the HMD frame.

Accordingly, the present disclosure includes head-mounted displays and methods that facilitate improved alignment of optical components with each other and/or with a frame of the head-mounted displays. The improved alignment of the optical components may inhibit (e.g., reduce or eliminate) optical deviations that would otherwise detract from a user's visual experience while using the head-mounted displays. In addition, assembly of optical components may be facilitated by employing the methods and systems disclosed herein.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1200 in FIG. 12) or that visually immerses a user in an artificial reality (such as, e.g., virtual-reality system 1300 in FIG. 13). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 12:
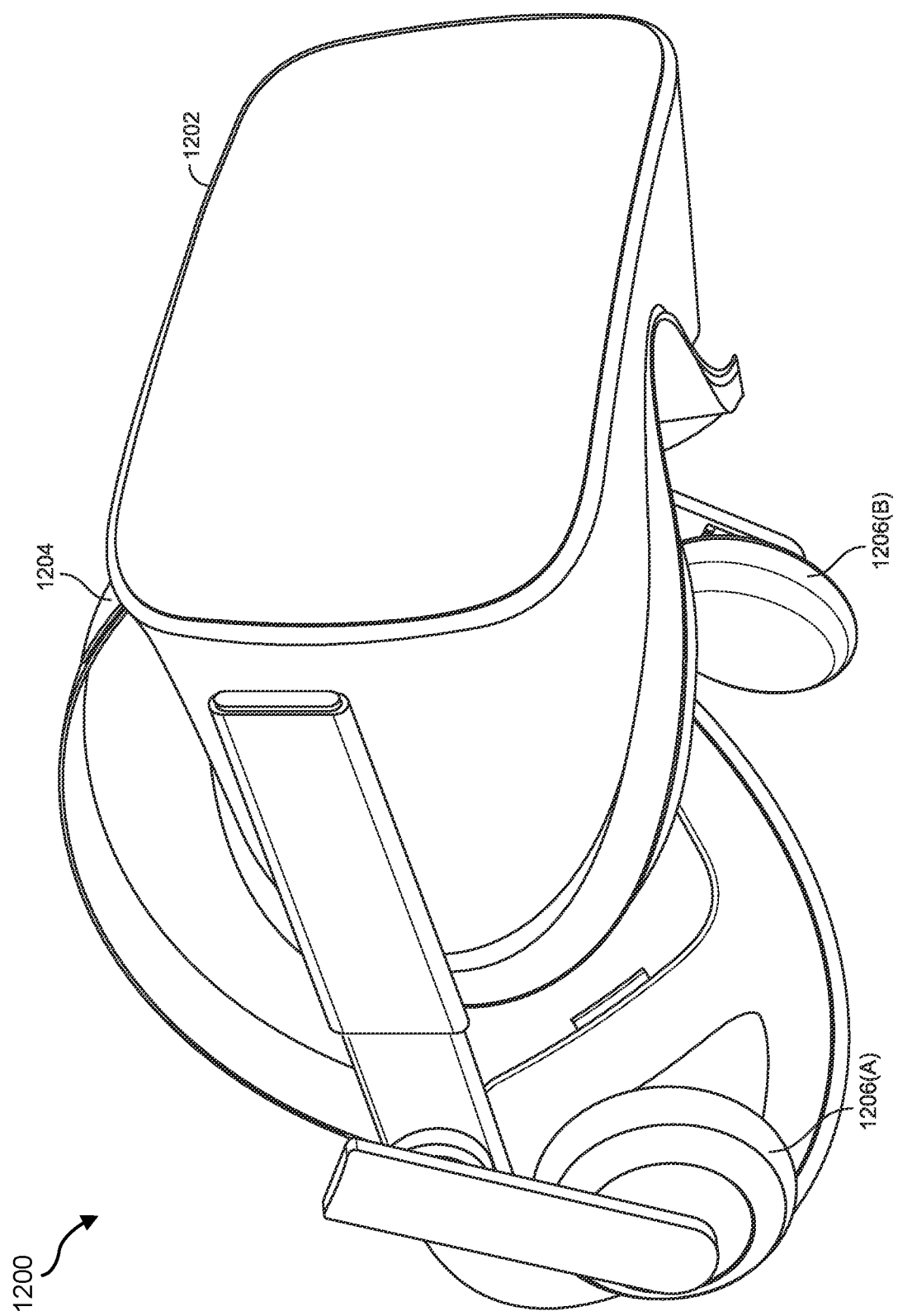
FIG. 12 is an illustration of an example virtual-reality headset that may be used in connection with embodiments of this disclosure.

Turning to FIG. 12, the augmented-reality system 1200 may include an eyewear device 1202 with a frame 1210 configured to hold a left display device 1215(A) and a right display device 1215(B) in front of a user's eyes. The display devices 1215(A) and 1215(B) may act together or independently to present an image or series of images to a user. While the augmented-reality system 1200 includes two displays, embodiments of this disclosure may be implemented in augmented-reality systems with a single NED or more than two NEDs.

In some embodiments, the augmented-reality system 1200 may include one or more sensors, such as sensor 1240. The sensor 1240 may generate measurement signals in response to motion of the augmented-reality system 1200 and may be located on substantially any portion of the frame 1210. The sensor 1240 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1200 may or may not include the sensor 1240 or may include more than one sensor. In embodiments in which the sensor 1240 includes an IMU, the IMU may generate calibration data based on measurement signals from the sensor 1240. Examples of the sensor 1240 may include, without limitation, accelerometers, gyroscopes, magnetometers, other suitable types of sensors that detect motion, sensors used for error correction of the IMU, or some combination thereof.

In some examples, the augmented-reality system 1200 may also include a microphone array with a plurality of acoustic transducers 1220(A)-1220(J), referred to collectively as acoustic transducers 1220. The acoustic transducers 1220 may represent transducers that detect air pressure variations induced by sound waves. Each acoustic transducer 1220 may be configured to detect sound and convert the detected sound into an electronic format (e.g., an analog or digital format). The microphone array in FIG. 12 may include, for example, ten acoustic transducers: 1220(A) and 1220(B), which may be designed to be placed inside a corresponding ear of the user, acoustic transducers 1220(C), 1220(D), 1220(E), 1220(F), 1220(G), and 1220(H), which may be positioned at various locations on the frame 1210, and/or acoustic transducers 1220(I) and 1220(J), which may be positioned on a corresponding neckband 1205.

In some embodiments, one or more of the acoustic transducers 1220(A)-(J) may be used as output transducers (e.g., speakers). For example, the acoustic transducers 1220 (A) and/or 1220(B) may be earbuds or any other suitable type of headphone or speaker.

The configuration of the acoustic transducers 1220 of the microphone array may vary. While the augmented-reality system 1200 is shown in FIG. 12 as having ten acoustic transducers 1220, the number of acoustic transducers 1220 may be greater or less than ten. In some embodiments, using higher numbers of acoustic transducers 1220 may increase the amount of audio information collected and/or the sensitivity and accuracy of the audio information. In contrast, using a lower number of acoustic transducers 1220 may decrease the computing power required by an associated controller 1250 to process the collected audio information. In addition, the position of each acoustic transducer 1220 of the microphone array may vary. For example, the position of an acoustic transducer 1220 may include a defined position on the user, a defined coordinate on the frame 1210, an orientation associated with each acoustic transducer 1220, or some combination thereof.

The acoustic transducers 1220(A) and 1220(B) may be positioned on different parts of the user's ear, such as behind the pinna, behind the tragus, and/or within the auricle or fossa. Or, there may be additional acoustic transducers 1220 on or surrounding the ear in addition to the acoustic transducers 1220 inside the ear canal. Having an acoustic transducer 1220 positioned next to an ear canal of a user may enable the microphone array to collect information on how sounds arrive at the ear canal. By positioning at least two of the acoustic transducers 1220 on either side of a user's head (e.g., as binaural microphones), the augmented-reality device 1200 may simulate binaural hearing and capture a 3D stereo sound field around about a user's head. In some embodiments, the acoustic transducers 1220(A) and 1220 (B) may be connected to the augmented-reality system 1200 via a wired connection 1230, and in other embodiments the acoustic transducers 1220(A) and 1220(B) may be connected to the augmented-reality system 1200 via a wireless connection (e.g., a BLUETOOTH connection). In still other embodiments, the acoustic transducers 1220(A) and 1220(B) may not be used at all in conjunction with the augmented-reality system 1200.

The acoustic transducers 1220 on the frame 1210 may be positioned in a variety of different ways, including along the length of the temples, across the bridge, above or below the display devices 1215(A) and 1215(B), or some combination thereof. The acoustic transducers 1220 may also be oriented such that the microphone array is able to detect sounds in a wide range of directions surrounding the user wearing the augmented-reality system 1200. In some embodiments, an optimization process may be performed during manufacturing of the augmented-reality system 1200 to determine relative positioning of each acoustic transducer 1220 in the microphone array.

In some examples, the augmented-reality system 1200 may include or be connected to an external device (e.g., a paired device), such as the neckband 1205. The neckband 1205 generally represents any type or form of paired device. Thus, the following discussion of the neckband 1205 may also apply to various other paired devices, such as charging cases, smart watches, smart phones, wrist bands, other wearable devices, hand-held controllers, tablet computers, laptop computers, other external compute devices, etc.

As shown, the neckband 1205 may be coupled to the eyewear device 1202 via one or more connectors. The connectors may be wired or wireless and may include electrical and/or non-electrical (e.g., structural) components. In some cases, the eyewear device 1202 and neckband 1205 may operate independently without any wired or wireless connection between them. While FIG. 12 illustrates the components of the eyewear device 1202 and neckband 1205 in example locations on the eyewear device 1202 and neckband 1205, the components may be located elsewhere and/or distributed differently on the eyewear device 1202 and/or neckband 1205. In some embodiments, the components of the eyewear device 1202 and neckband 1205 may be located on one or more additional peripheral devices paired with the eyewear device 1202, neckband 1205, or some combination thereof.

Pairing external devices, such as the neckband 1205, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1200 may be provided by a paired device or shared between a paired device and an eyewear device, thus reducing the weight, heat profile, and form factor of the eyewear device overall while still retaining desired functionality. For example, the neckband 1205 may allow components that would otherwise be included on an eyewear device to be included in the neckband 1205 since users may tolerate a heavier weight load on their shoulders than they would tolerate on their heads. The neckband 1205 may also have a larger surface area over which to diffuse and disperse heat to the ambient environment. Thus, the neckband 1205 may allow for greater battery and computation capacity than might otherwise have been possible on a stand-alone eyewear device. Since weight carried in the neckband 1205 may be less invasive to a user than weight carried in the eyewear device 1202, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1205 may be communicatively coupled with the eyewear device 1202 and/or to other devices. These other devices may provide certain functions (e.g., tracking, localizing, depth mapping, processing, storage, etc.) to augmented-reality system 1200. In the embodiment of FIG. 12, neckband 1205 may include two acoustic transducers (e.g., 1220(I) and 1220(J)) that are part of the microphone array (or potentially form their own microphone subarray). Neckband 1205 may also include a controller 1225 and a power source 1235.

Acoustic transducers 1220(I) and 1220(J) of neckband 1205 may be configured to detect sound and convert the detected sound into an electronic format (analog or digital). In the embodiment of FIG. 12, acoustic transducers 1220(I) and 1220(J) may be positioned on neckband 1205, thereby increasing the distance between the neckband acoustic transducers 1220(I) and 1220(J) and other acoustic transducers 1220 positioned on eyewear device 1202. In some cases, increasing the distance between acoustic transducers 1220 of the microphone array may improve the accuracy of beamforming performed via the microphone array. For example, if a sound is detected by acoustic transducers 1220(C) and 1220(D) and the distance between acoustic transducers 1220(C) and 1220(D) is greater than, e.g., the distance between acoustic transducers 1220(D) and 1220(E), the determined source location of the detected sound may be more accurate than if the sound had been detected by acoustic transducers 1220(D) and 1220(E).

Controller 1225 of neckband 1205 may process information generated by the sensors on neckband 1205 and/or augmented-reality system 1200. For example, controller 1225 may process information from the microphone array that describes sounds detected by the microphone array. For each detected sound, controller 1225 may perform a direction-of-arrival (DOA) estimation to estimate a direction from which the detected sound arrived at the microphone array. As the microphone array detects sounds, controller 1225 may populate an audio data set with the information. In embodiments in which augmented-reality system 1200 includes an inertial measurement unit, controller 1225 may compute all inertial and spatial calculations from the IMU located on eyewear device 1202. A connector may convey information between augmented-reality system 1200 and neckband 1205 and between augmented-reality system 1200 and controller 1225. The information may be in the form of optical data, electrical data, wireless data, or any other transmittable data form. Moving the processing of information generated by augmented-reality system 1200 to neckband 1205 may reduce weight and heat in eyewear device 1202, making it more comfortable to the user.

Power source 1235 in neckband 1205 may provide power to eyewear device 1202 and/or to neckband 1205. Power source 1235 may include, without limitation, lithium ion batteries, lithium-polymer batteries, primary lithium batteries, alkaline batteries, or any other form of power storage. In some cases, power source 1235 may be a wired power source. Including power source 1235 on neckband 1205 instead of on eyewear device 1202 may help better distribute the weight and heat generated by power source 1235.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1300 in FIG. 13, that mostly or completely covers a user's field of view. Virtual-reality system 1300 may include a front rigid body 1302 and a band 1304 shaped to fit around a user's head. Virtual-reality system 1300 may also include output audio transducers 1306(A) and 1306(B). Furthermore, while not shown in FIG. 13, front rigid body 1302 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1200 and/or virtual-reality system 1300 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1200 and/or virtual-reality system 1300 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1200 and/or virtual-reality system 1300 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The following example embodiments are also included in this disclosure:

Example 1: A method of assembling a head-mounted display (HMD), which may include: coupling a first digital projector assembly to an HMD frame; coupling a second digital projector assembly to the HMD frame; after the first digital projector assembly and the second digital projector assembly are coupled to the HMD frame, warping the HMD frame to optically align the first digital projector assembly with the second digital projector assembly; and fixing the warped HMD frame such that the first digital projector assembly is optically aligned to the second digital projector assembly to within a predetermined threshold.

Example 2: The method of Example 1, wherein warping the HMD frame comprises at least one of: bending the HMD frame; or twisting the HMD frame.

Example 3: The method of Example 1 or Example 2, further comprising, prior to warping the HMD frame, determining an offset between a first optical output of the first digital projector assembly and a second optical output of the second digital projector assembly.

Example 4: The method of Example 3, wherein determining the offset comprises: measuring a first angle of the first optical output; measuring a second angle of the second optical output; and determining an angular difference between the first angle and the second angle.

Example 5: The method of any of Examples 1 through 4, wherein warping the HMD frame comprises: overwarping the HMD frame past a target geometry of the HMD frame; and allowing the overwarped HMD frame to spring back to the target geometry, wherein the first digital projector assembly and the second digital projector assembly are optically aligned to within the predetermined threshold when the HMD frame has the target geometry.

Example 6: The method of any of Examples 1 through 5, wherein fixing the HMD frame in the warped configuration comprises securing an enclosure to the HMD frame while holding the HMD frame in the warped configuration.

Example 7: The method of Example 6, wherein securing the enclosure to the HMD frame comprises at least one of: fastening the enclosure to the HMD frame; adhering the enclosure to the HMD frame; or welding the enclosure to the HMD frame.

Example 8: The method of any of Examples 1 through 7, further comprising heating at least a portion of the HMD frame to facilitate the warping of the HMD frame.

Example 9: The method of any of Examples 1 through 8, wherein at least portions of the HMD frame that are warped comprise at least one of: a metal material; or a polymer material.

Example 10: The method of any of Examples 1 through 9, wherein coupling the first digital projector assembly and the second digital projector assembly to the HMD frame comprises fastening the first digital projector assembly and the second digital projector assembly to the HMD frame with at least one screw or bolt.

Example 11: The method of any of Examples 1 through 10, wherein: coupling the first digital projector assembly to the HMD frame comprises abutting the first digital projector assembly against a first surface of the HMD frame; and coupling the second digital projector assembly to the HMD frame comprises abutting the second digital projector assembly against a second surface of the HMD frame.

Example 12: The method of any of Examples 1 through 11, wherein the HMD frame comprises an augmented-reality glasses frame.

Example 13: The method of Example 1, further comprising coupling at least one waveguide to the HMD frame to direct a stereoscopic image generated by the first digital projector assembly and the second digital projector assembly to a location in front of an intended user's eyes.

Example 14: A method of assembling a head-mounted display (HMD), the method including: coupling a first digital projector assembly and a second digital projector assembly to an HMD frame including abutting the first digital projector assembly and the second digital projector assembly against the HMD frame; after the first digital projector assembly and the second digital projector assembly are coupled to the HMD frame, warping the HMD frame to align a first optical output of the first digital projector assembly with a second optical output of the second digital projector assembly; and securing an enclosure to the warped HMD frame to fix the warped HMD frame in a target geometry such that the first digital projector assembly is optically aligned to the second digital projector assembly to within a predetermined threshold.

Example 15: The method of Example 14, wherein the predetermined threshold is 10 arcminutes or less.

Example 16: The method of Example 14 or Example 15, wherein warping the HMD frame comprises overwarping the HMD frame past the target geometry and allowing the overwarped HMD to spring back to the target geometry.

Example 17: The method of any of Examples 14 through 16, wherein warping the HMD frame comprises at least one of: bending the HMD frame; or twisting the HMD frame.

Example 18: The method of any of Examples 14 through 17, wherein securing the enclosure to the HMD frame comprises at least one of: fastening the enclosure to the HMD frame; adhering the enclosure to the HMD frame; or welding the enclosure to the HMD frame.

Example 19: A system for assembling a head-mounted display (HMD), which may include: at least one optical sensor positioned and configured to sense a first angle of a first optical output of a first digital projector assembly coupled to an HMD frame and a second angle of a second optical output of a second digital projector assembly coupled to the HMD frame; a warping mechanism configured for supporting the HMD frame and warping the HMD frame to optically align the first digital projector assembly with the second digital projector assembly; and a fixing mechanism configured for fixing the warped HMD frame such that the first digital projector assembly is optically aligned to the second digital projector assembly to within a predetermined threshold.

Example 20: The system of Example 19, further comprising a heating element positioned and configured to heat at least a portion of the HMD frame to facilitate the warping of the HMD frame.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method of assembling a head-mounted display (HMD), the method comprising:
coupling a first digital projector assembly to an HMD frame;
coupling a second digital projector assembly to the HMD frame;
after the first digital projector assembly and the second digital projector assembly are coupled to the HMD frame, warping the HMD frame to optically align the first digital projector assembly with the second digital projector assembly; and
fixing the warped HMD frame such that the first digital projector assembly is optically aligned to the second digital projector assembly to within a predetermined threshold,
wherein fixing the warped HMD frame comprises permanently securing an enclosure to the HMD frame while holding the HMD frame in a warped configuration.

2. The method of claim 1, wherein warping the HMD frame comprises at least one of:
bending the HMD frame; or
twisting the HMD frame.

3. The method of claim 1, further comprising, prior to warping the HMD frame, determining an offset between a first optical output of the first digital projector assembly and a second optical output of the second digital projector assembly.

4. The method of claim 3, wherein determining the offset comprises:
measuring a first angle of the first optical output relative to an optical coordinate system associated with at least one optical alignment camera;
measuring a second angle of the second optical output relative to the optical coordinate system; and
determining an angular difference between the first angle and the second angle.

5. The method of claim 1, wherein warping the HMD frame comprises:
overwarping the HMD frame past a target geometry of the HMD frame; and
allowing the overwarped HMD frame to spring back to the target geometry, wherein the first digital projector assembly and the second digital projector assembly are optically aligned to within the predetermined threshold when the HMD frame has the target geometry.

6. The method of claim 1, wherein permanently securing the enclosure to the HMD frame comprises at least one of:
fastening the enclosure to the HMD frame;
adhering the enclosure to the HMD frame; or
welding the enclosure to the HMD frame.

7. The method of claim 1, further comprising heating at least a portion of the HMD frame to facilitate the warping of the HMD frame.

8. The method of claim 1, wherein at least portions of the HMD frame that are warped comprise at least one of:
a metal material; or
a polymer material.

9. The method of claim 1, wherein coupling the first digital projector assembly and the second digital projector assembly to the HMD frame comprises fastening the first digital projector assembly and the second digital projector assembly to the HMD frame with at least one screw or bolt.

10. The method of claim 1, wherein:
coupling the first digital projector assembly to the HMD frame comprises abutting the first digital projector assembly against a first surface of the HMD frame; and
coupling the second digital projector assembly to the HMD frame comprises abutting the second digital projector assembly against a second surface of the HMD frame.

11. The method of claim 1, wherein the HMD frame comprises an augmented-reality glasses frame.

12. The method of claim 1, further comprising coupling at least one waveguide to the HMD frame to direct a stereoscopic image generated by the first digital projector assembly and the second digital projector assembly to a location in front of an intended user's eyes.

13. A method of assembling a head-mounted display (HMD), the method comprising:
coupling a first digital projector assembly and a second digital projector assembly to an HMD frame including abutting the first digital projector assembly and the second digital projector assembly against the HMD frame;
after the first digital projector assembly and the second digital projector assembly are coupled to the HMD frame, warping the HMD frame to align a first optical output of the first digital projector assembly with a second optical output of the second digital projector assembly; and
after warping the HMD frame, permanently securing an enclosure to the warped HMD frame to fix the warped HMD frame in a target geometry such that the first digital projector assembly is optically aligned to the second digital projector assembly to within a predetermined threshold.

14. The method of claim 13, wherein the predetermined threshold is 10 arcminutes or less.

15. The method of claim 13, wherein warping the HMD frame comprises overwarping the HMD frame past the target geometry and allowing the overwarped HMD to spring back to the target geometry.

16. The method of claim 13, wherein warping the HMD frame comprises at least one of:
bending the HMD frame; or
twisting the HMD frame.

17. The method of claim 13, wherein permanently securing the enclosure to the HMD frame comprises at least one of:
fastening the enclosure to the HMD frame;
adhering the enclosure to the HMD frame; or
welding the enclosure to the HMD frame.

* * * * *